JOHN E. SMITH.

Improvement in Pole Changers for Electrical Apparatus.

No. 127,809.  Patented June 11, 1872.

UNITED STATES PATENT OFFICE.

JOHN E. SMITH, OF NEW YORK, N. Y.

IMPROVEMENT IN POLE-CHANGERS FOR ELECTRICAL APPARATUS.

Specification forming part of Letters Patent No. 127,809, dated June 11, 1872.

Specification describing an Improvement in Pole-Changers for Electrical Machines, the invention of JOHN E. SMITH, of the city, county, and State of New York.

This invention consists in a pole-changer or current-reverser, of simple construction, composed mainly of a single metallic or other suitable wheel, a couple of springs, and two adjustable screws or points of electrical contact, the whole being arranged so that the pole-changer is made to operate by two rubbing and two direct-pressure electrical connections.

Figure 1:
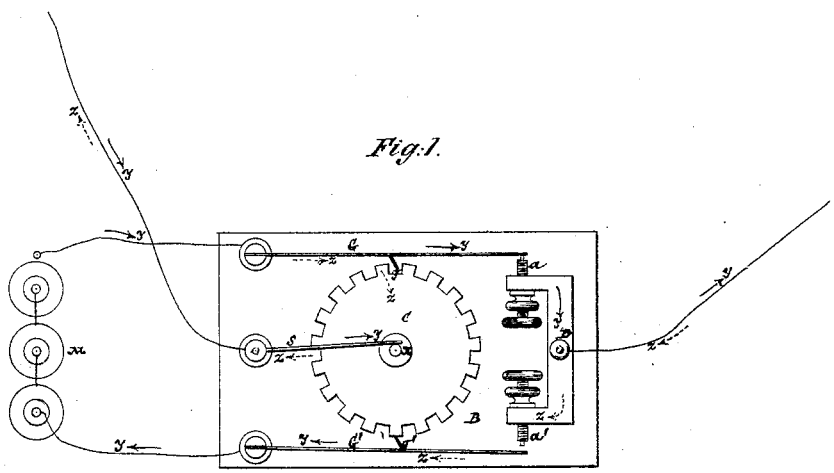
Figure 2:
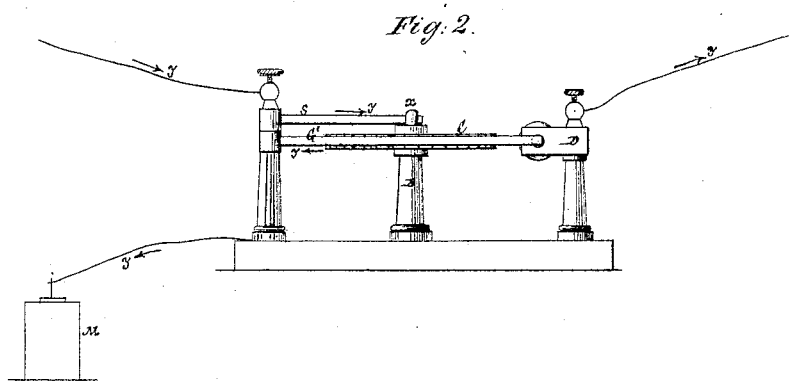

In the accompanying drawing, which forms part of this specification, Figure 1 represents a plan of my improved pole-changer in connection with a battery and the two wires of an electric circuit. Fig. 2 is an elevation of the same.

Similar letters of reference indicate corresponding parts in both figures of the drawing.

C is the operating wheel of the pole-changer. This wheel is of metal, and is provided with any desired number of teeth. It is carried by a suitable metallic frame, B, and may be turned by hand or by a weight or spring acting through a train of clock-work. Against the shaft $x$ of said wheel a spring, $s$, presses, in order to form electrical connection between the wheel C and any circuit over which it is desired to reverse a current; or the circuit may be attached to any part of the metallic frame which supports the wheel. D is a metallic support for two adjustable screws, $a$ $a'$, which should be pointed with platinum. The support D also holds the circuit leading in a direction opposite to the wire attached to the spring $s$, and therefore must be insulated from the frame which supports the wheel C. G is a metallic spring, having a projection at $g$, for forming electrical connection with the wheel C as the latter revolves, by which means said spring is also caused to make and break circuit at the tip of the screw $a$. G$'$ is a similar spring, made to act in precisely the same manner and having a projection, $g'$; but the projections $g$ $g'$ are so located that when one of them rests on the center of a tooth of the wheel C the other projection is at the middle of one of the spaces between the teeth.

If the positive pole of a battery, M, be connected with the spring G, and the negative pole with the spring G$'$, and the wheel C be made to pause in the position indicated by the drawing, the spring G$'$ will be in electrical connection with the wheel C at $g'$, but not with the screw $a'$. The spring G will connect with the screw $a$ but not with the wheel C. The current will then flow, as shown by the full arrows $y$—that is, from the positive pole over the spring G, through the screw $a$ and half of the support D, through the circuit back to $s$, and over it to and through the wheel C to the projection $g'$, and over a portion of the spring G$'$ to the negative pole of the battery. Now, if the wheel C be turned to the right half a tooth the projection $g'$ will then fall between the teeth, and the spring G$'$ will connect with the screw $a'$, but the projection $g$ will rest on a tooth of the wheel C, while the spring G will be lifted from the screw $a$. This causes the current to pass as indicated by the dotted arrows $z$—that is, from the positive pole of the battery to the projection $g$, through the wheel C, to and over the spring $s$, thence through the circuit to the support D, through one-half of said support to the screw $a'$, over the whole of the spring G$'$, back to the negative pole of the battery. It will be seen that from the battery to the projections $g$ and $g'$ the current must go in the same direction in both cases, as shown by the full arrows.

Claim.

I claim—

A pole-changer, composed of the toothed wheel C, the springs G G$'$, and the adjustable screws or points of electrical contact $a$ $a'$, the whole being arranged for operation substantially as described.

J. E. SMITH.

Witnesses:
 FRED. HAYNES,
 R. E. RABEAU.